United States Patent [19]

Chirra

[11] 4,368,957
[45] Jan. 18, 1983

[54] WIDE APERTURE OBJECTIVE LENS

[75] Inventor: Ramalinga R. Chirra, Santa Monica, Calif.

[73] Assignee: Discovision Associates, Costa Mesa, Calif.

[21] Appl. No.: 202,841

[22] Filed: Oct. 31, 1980

[51] Int. Cl.³ .............................................. G02B 9/34
[52] U.S. Cl. ................................................. 350/469
[58] Field of Search ................ 350/465, 470, 471, 469

[56] References Cited

U.S. PATENT DOCUMENTS 4,240,704  12/1980  Goto ..................................... 350/469
4,257,679  3/1981  Okawa ................................... 350/469

FOREIGN PATENT DOCUMENTS 54-43755  4/1979  Japan .................................... 350/469
54-127339  10/1979  Japan .................................... 350/469

Primary Examiner—John K. Corbin
Assistant Examiner—Rebecca Gass
Attorney, Agent, or Firm—Ronald J. Clark

[57] ABSTRACT

An objective lens comprising five lens elements and intended for use in an optical recording system wherein a laser beam is focused onto a recording surface located beneath a plastic layer over the disc. The disclosed lens has a relatively large numeric aperture of 0.75, but has a relatively large working distance between the lens and the disc and a relatively low total mass, to facilitate rapid movement of the lens. In addition, the lens is color corrected to accommodate a range of spectral frequencies present in the laser beam.

6 Claims, 14 Drawing Figures

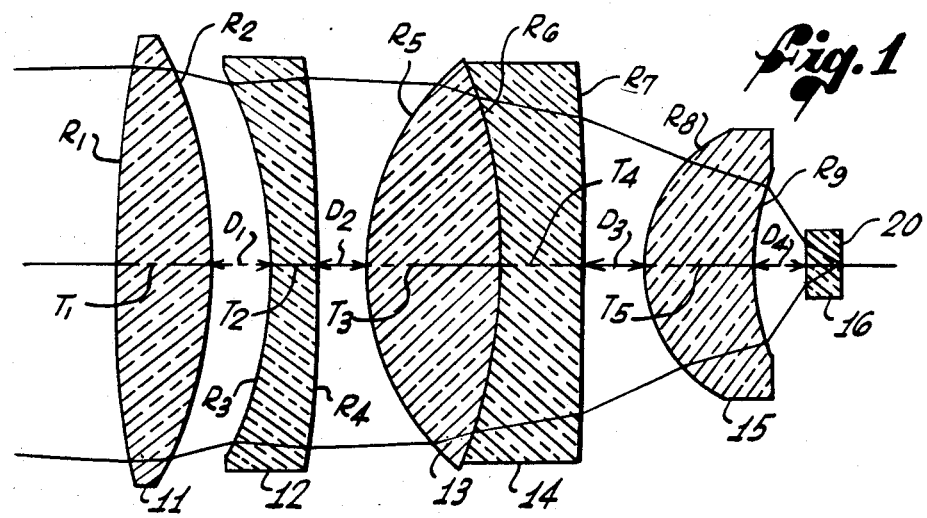
Fig. 1
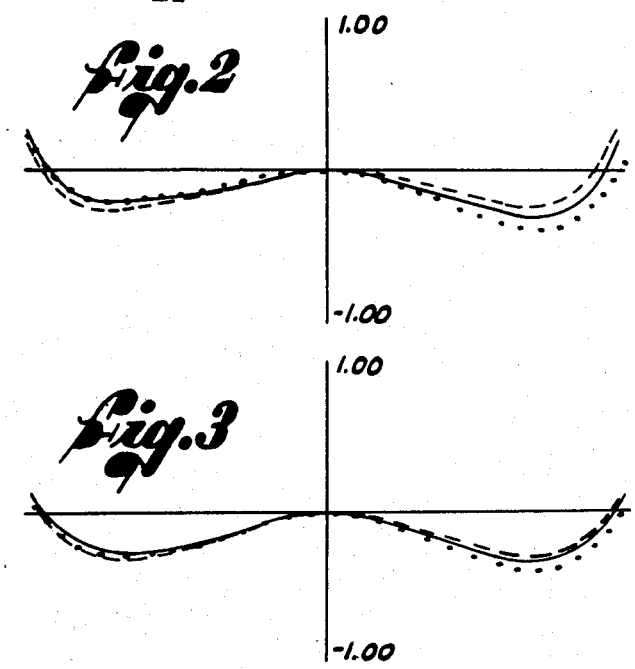
Fig. 2
Fig. 3
Fig. 4
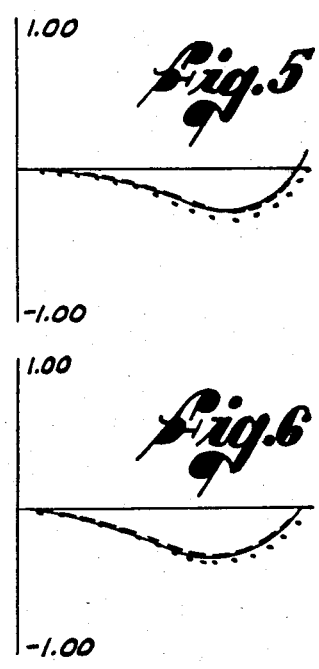
Fig. 5
Fig. 6
Fig. 7
--- 476.5 nm
—— 488 nm
•••• 498.5 nm
OPTICAL PATH DIFFERENCE (WAVES)

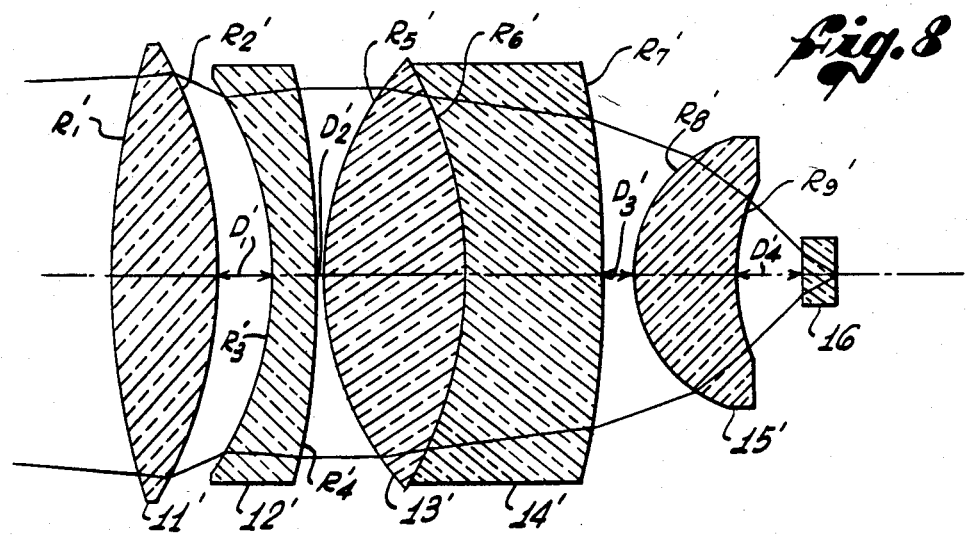
fig.8
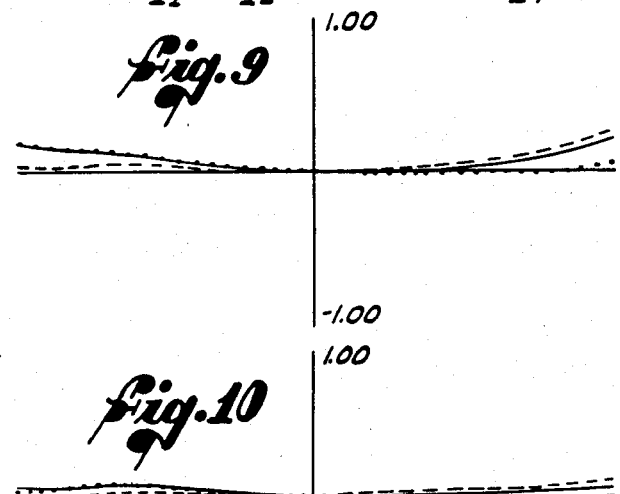
fig.9
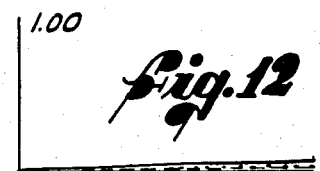
fig.12
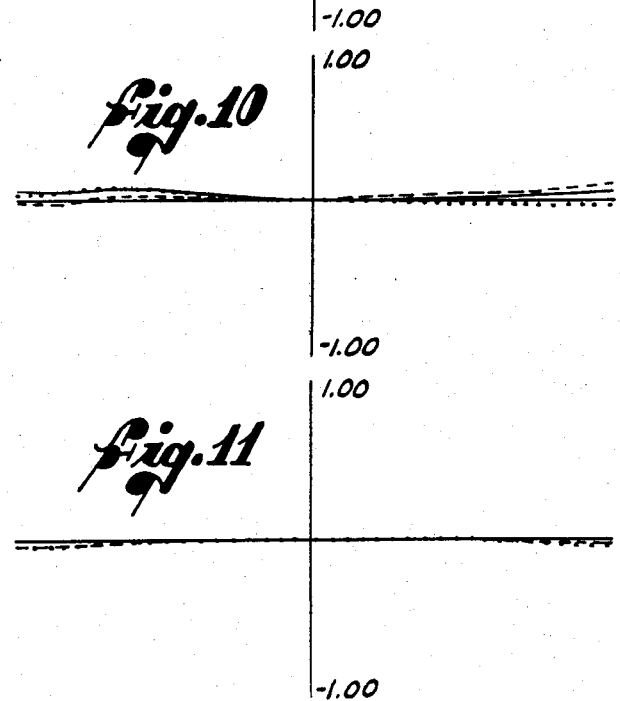
fig.10
fig.11
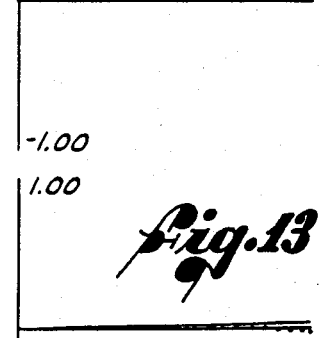
fig.13
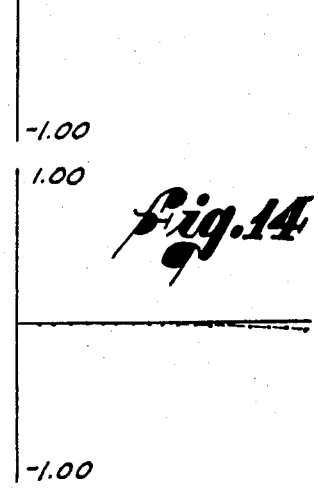
fig.14

WIDE APERTURE OBJECTIVE LENS

BACKGROUND OF THE INVENTION

This invention relates generally to objective lenses, and, more particularly, to objective lenses used in the recording and playback of signals recorded optically on rotatable discs.

It is well known that information may be recorded on an information track on a disc by means of a modulated laser beam. The information track takes the form of a series of pits in the disc surface. When a playback laser beam is directed onto the surface, the information is retrieved from the information track, since the playback beam is selectively reflected by the presence or absence of pits in the surface. This technique is generally well known in the video recording field, and may also be used for the storage and retrieval of digital information, such as may be used in conjunction with a computer system.

The information is recorded on the disc either in a spiral track or in a plurality of concentric circular tracks on the disc surface. In either case, means must be provided for focusing the laser beam onto the disc surface in a spot size of the order of one micron in diameter. For recording purposes, the focused laser beam must have sufficient power to effect the necessary deformation of the surface, typically by means of a controlled combustion or melting process. Accordingly, a relatively high numerical aperture objective lens is desirable for this application. Moreover, the working distance or clearance between the lens and the recording surface needs to be great enough to minimize the possibility of inadvertent contact with the disc surface.

Although it is possible to design an objective lens with the desirable characteristics of high numerical aperture and relatively large working distance, such a lens would typically be bulky and massive. Unfortunately, another requirement for an objective lens used in the recording of information on a disc is that the total mass of the lens be minimized, to facilitate rapid movement of the lens both in a radial direction, to move from one information track to another and to automatically align with a given information track, and in a direction perpendicular to the disc surface, to ensure automatic focusing of the beam.

Another difficulty is that lasers typically used for recording in such systems, such as argon-ion lasers, provide coherent light at more than one wavelength. Although the laser beam could be filtered to provide a monochromatic source, this would substantially reduce the total power of the beam and would therefore necessitate a laser of substantially higher power for recording purposes. Accordingly, the objective lens used to focus the beam on the disc surface should ideally be color corrected to provide a properly focused beam over a range of frequencies including those generated by the laser.

It will be appreciated from the foregoing that there has been a significant need for an objective lens having the desirable characteristics of a relatively large numerical aperture, a relatively large working distance, and low total mass, and which is color corrected over the range of wavelengths produced by the laser. The present invention satisfies this need.

SUMMARY OF THE INVENTION

The present invention resides in an objective lens having five elements which together provide a numerical aperture of approximately 0.75, a working distance of approximately 2 millimeters, and a relatively low total mass, and which are color corrected to such a degree that the optical path difference does not exceed one quarter of a wavelength over the intended spectral range of the lens.

More specifically, in accordance with a presently preferred embodiment of the invention, the objective lens comprises five elements having the following approximate radius, thickness and spacing.

| Element | $R_L$(mm) | $R_R$(mm) | T(mm) | D(mm) |
|---|---|---|---|---|
| 1 | 32.7 | −15.5 | 3.3 | 2.0 |
| 2 | −12.2 | −37.7 | 1.6 | 0.2 |
| 3 | 9.8 | −14.6 | 4.5 | 0 |
| 4 | −14.6 | −43.0 | 5.0 | 1.1 |
| 5 | 4.8 | 7.8 | 3.4 | 2.1 | where:

the elements are numbered from left to right, the light entering element 1 first;

a positive radius means the center of curvature is to the right of the element;

a negative radius means the center of curvature is to the left of the element;

$R_L$=radius of left face of lens;

$R_R$=radius of right face of lens;

T=lens thickness at the central axis; and

D=distance to next lens element, at the axis.

These five elements cooperate with a sixth element having optically flat parallel surfaces and a thickness of approximately 1.2 millimeters. This sixth element is a plastic coating formed over a disc on which information is to be recorded. The focal point at which the laser beam converges is located at the plane of contact between this sixth optical element and the recording surface of the disc. The weight of the composite lens is approximately four grams and the numerical aperture is 0.75. Furthermore, the lens is color corrected to provide a desirably small composite aberration characteristic for wavelengths of 476.5 nanometers (nm), 488.0 nm and 496.5 nm.

In accordance with a second embodiment of the invention, the lens elements have approximately the following dimensional relationships:

| Element | $R_L$(mm) | $R_R$(mm) | T(mm) | D(mm) |
|---|---|---|---|---|
| 1 | 32.7 | −15.0 | 3.6 | 1.8 |
| 2 | −12.0 | −38.4 | 1.5 | 1.8 |
| 3 | 10.2 | −14.1 | 4.4 | 0 |
| 4 | −14.1 | −38.4 | 2.7 | 2.2 |
| 5 | 4.8 | 7.9 | 3.8 | 1.9 | where $R_L$, $R_R$, D and T have the same meaning as in the first described embodiment.

It will be appreciated from the foregoing that the present invention provides an ideal objective lens for use in recording of information on a disc. In particular, it combines a high numerical aperture, low mass, and relatively large working distance, and displays minimal optical aberration, as measured by the optical path difference, over a range of wavelengths. Other aspects and advantages of the present invention will become appar-

BRIEF DESCRIPTION OF THE DRAWINGS

FIG. 1 is a longitudinal cross-sectional view of one embodiment of the objective lens of the invention;

FIGS. 2-7 are graphical representations of the aberrational characteristics of the lens shown in FIG. 1 for three different wavelengths of light;

FIG. 8 is a cross-sectional view of a second embodiment of an objective lens of the invention; and FIGS. 9-14 are graphical representations of the aberrational characteristics of the lens shown in FIG. 8 for three different wavelengths of light.

DESCRIPTION OF THE PREFERRED EMBODIMENTS

As shown in the drawings for purposes of illustration, the present invention relates to an objective lens intended for use in an optical recording system in which a light beam from a laser is focused onto a recording track surface and is modulated in such a manner as to cause selective deformation of the surface. When the light beam is modulated in accordance with an information signal to be recorded, the resulting deformations in the recording surface are representative of the information signal, which may be later reproduced from the disc by means of another laser beam. The information signal is recreated as a result of the variations in reflectivity of the disc surface along the recording track. Recording systems of this general type may be used to store digital information as part of a large and infrequently changed data base.

The recording beam in such a system is focused onto the recording track through an objective lens, which must have certain ideal properties if the recording process is to be carried out in an efficient manner. First, the lens must be capable of focusing a relatively large diameter coherent light beam into a small point of light of approximately one micron in diameter. Coupled with this, the total lens mass must be low, to allow for rapid movements of the lens to make automatic focus adjustments, and the working distance or clearance between the lens and the disc must be large enough to minimize the risk of contact between the two. Finally, the lens should be color corrected to accommodate the range of spectral frequencies contained within the laser beam, so that maximum power may be provided in the focused recording beam.

More specifically, the composite objective lens indicated generally by reference numeral 10 in FIG. 1, comprises five lens elements 11-15, respectively, where lens element 11 is located at the ray entrance side of the lens (the left side as viewed in FIG. 1), and is the element through which light from a laser light source (not shown) first enters. The first element 11 is of positive power and has convex outer surfaces of radius $R_1$ and $R_2$, respectively, as indicated in the drawings, and has a thickness $T_1$ measured at the central axis of the lens. Spaced from the first lens element 11 by a distance $D_1$ is the second lens element 12, of thickness $T_2$, the left-hand radius of which is $R_3$ and the right-hand radius of which is $R_4$, the first radius $R_3$ providing a concave surface and the second radius $R_4$ providing convex surface.

The third lens element 13 is spaced by a distance $D_2$ from the second lens element 12 and has a thickness $T_3$, a left-hand convex radius $R_5$ and a right-hand convex radius $R_6$, the latter defining a convex surface in contact with a corresponding concave surface of the fourth lens element 14. Element 14 has a thickness $T_4$ and a right-hand radius $R_7$ defining a slightly convex surface.

The fifth lens element 15 is spaced by a distance $D_3$ from lens element 14, and has a thickness $T_5$, a left-hand radius $R_8$ defining a convex surface on the left-hand side of the lens element and a radius $R_9$ defining a concave surface on the right-hand side of the lens element. The fifth lens element 15 is spaced by a distance $D_4$ from a sixth element 16 having parallel sides of infinite radius and representing a clear plastic layer over the recording surface of a recording disc (not shown). As shown by the outer light rays in the figure, the light beam is focused on the inner surface 20 of the plastic layer 16.

For the lens shown in FIG. 1, the following are the lens radius thickness, spacing and aperture dimensions:

| Element | $R_L$ | $R_R$ | T | D | $CA_1$ | $CA_2$ | Glass |
|---|---|---|---|---|---|---|---|
| 1 | 32.7044 | −15.0488 | 3.6079 | 1.8101 | 13.4574 | 13.3395 | BK7 |
| 2 | −11.9675 | −38.3523 | 1.5351 | 1.7724 | 12.0004 | 12.3822 | SF4 |
| 3 | 10.1568 | −14.1338 | 4.4491 | 0 | 12.3982 | 11.9032 | BK10 |
| 4 | −14.1338 | −38.4148 | 2.7381 | 2.1824 | 11.9032 | 11.0109 | SF4 |
| 5 | 4.8765 | 7.8559 | 3.7852 | 1.8934 | 7.8730 | 4.8568 | LAFN2 |
| 6 | Infinite | Infinite | 1.2000 | — | 1.4536 | 0.0916 | Plastic | where:

$R_L$ is the radius of the left-hand face of the lens element (mm);

$R_R$ is the radius of the right-hand face of the lens element (mm);

T is the thickness of the lens at the central axis (mm);

D is the distance to the next lens element;

$CA_1$ is the entrance clear aperture (mm);

$CA_2$ is the exit clear aperture (mm); and the glass types are designations of the Schott Optical Company, of Duryea, Pa.

The composite objective lens system shown in FIG. 1 has a desirably high numerical aperture of 0.75, a working distance of approximately two millimeters, this being the distance $D_4$, and a relatively low mass of only approximately four grams. Moreover, as shown in FIGS. 2-7, the optical path difference never exceeds approximately one half of a wavelength for any of the three wavelengths for which the aberrational characteristics were recorded.

More specifically, FIGS. 2-4 show in conventional form the variation in the path length difference, measured in wavelengths along the Y axis, with respect to various locations in the tangential plane. FIG. 2 gives the aberrational curves for a relative field height of 1.00 (or 0.23° half-angle), FIG. 3 provides the corresponding information for a relative field height of 0.71 (0.16° half-angle), and FIG. 4 provides the corresponding information for a relative field height of zero. FIGS. 5-7 show the corresponding path length differences in the sagittal plane, for field heights of 1.0, 0.71 and zero, respectively.

In FIGS. 2–7 and 9–14, the broken line plots the path length difference for a wavelength of 476.5 nm, the solid line corresponds to a wavelength of 488.0 nm, and the dotted line corresponds to a wavelength of 496.5 nm.

FIG. 8 shows a second embodiment of the invention, in which the lens elements have been designated 11'-15' to distinguish them from the elements shown in FIG. 1. The radius, thickness, spacing and aperture data for the FIG. 8 embodiment are as follows:

| Element | $R_L$ | $R_R$ | T | D | $CA_1$ | $CA_2$ | Glass |
|---|---|---|---|---|---|---|---|
| 1 | 32.6695 | −15.4635 | 3.2362 | 2.0055 | 13.5825 | 13.4938 | BK7 |
| 2 | −12.1539 | −37.6936 | 1.5540 | 0.2000 | 12.0221 | 12.3894 | SF4 |
| 3 | 9.8044 | −14.5821 | 4.4889 | 0 | 12.3616 | 11.8247 | BK10 |
| 4 | −14.5821 | −43.0454 | 5.0000 | 1.0751 | 11.8247 | 10.1838 | SF4 |
| 5 | 4.7701 | 7.7597 | 3.4288 | 2.0934 | 7.8036 | 5.1739 | LAFN2 |
| 6 | Infinite | Infinite | 1.2000 | — | 1.4621 | 0.0809 | Plastic | where:

$R_L$ is the radius of the left-hand face of the lens element (mm);

$R_R$ is the radius of the right-hand face of the lens element (mm);

T is the thickness of the lens at the central axis (mm);

D is the distance to the next lens element;

$CA_1$ is the entrance clear aperture (mm); and $CA_2$ is the exit clear aperture (mm).

Again, the composite lens has a numerical aperture of 0.75 and a working distance of approximately two millimeters (2.09 mm). However, the aberrational data given in FIGS. 9–14 show that the path length difference never exceeds approximately one-sixth of a wavelength for the three wavelengths under consideration. The arrangement of FIGS. 9–14 corresponds to that of FIGS. 2–7. FIGS. 9–11 show the path length differences in the tangential plane for relative field heights of 1.0, 0.71 and zero, respectively, and FIGS. 12–14 give the corresponding sagittal plane information.

The plastic layer 16 with which the lens of the invention cooperates has refractive indices of 1.4986, 1.4977 and 1.4971 at wavelengths of 476.5 nm, 488.0 nm and 496.5 nm, respectively. It will be appreciated, of course, that the lens may be appropriately modified to accommodate other optical or dimensional properties of the layer 16.

It will be appreciated from the foregoing that the present invention represents a significant advance in the field of objective lenses for optical disc recording systems. In particular, the lens of the invention provides a high numerical aperture, while maintaining a relatively large working distance from the disc surface and a relatively low total mass to facilitate rapid movement of the lens. In addition, the lens of the invention is color corrected to avoid the need for filtering the laser light source and thereby reducing the power available at the recording surface. It will also be appreciated that the embodiments described herein for purposes of illustration may be modified, especially dimensionally, without departing from the spirit and scope of the invention. Accordingly, it is not intended that the invention be limited to the specific dimensions of the illustrative embodiments.

I claim:

1. A light-weight, wide-aperture objective lens for use in an optical disc recording system, said lens comprising:

a first lens element of the double-convex type;

a second lens element being of the negative meniscus type, having its concave surface facing said first lens element and spaced therefrom;

a third lens element, being of the double-convex type, and spaced from said second lens element;

a fourth lens element, being of the negative meniscus type and having its concave surface in surface contact with said third lens element; and a fifth lens element, being of the positive meniscus type, having its convex surface toward said fourth lens element and spaced therefrom;

wherein, provided said fifth element is spaced by a preselected distance from a plastic layer having uniform thickness, of approximately 1.2 mm, light from said objective lens is refracted through the layer and focused substantially at the point of exit from the layer;

wherein said lens has radius, spacing and thickness dimensions approximately as follows:

| Element | $R_L$(mm) | $R_R$(mm) | T(mm) | D(mm) |
|---|---|---|---|---|
| 1 | 32.7 | −15.0 | 3.6 | 1.8 |
| 2 | −12.0 | −38.4 | 1.5 | 1.8 |
| 3 | 10.2 | −14.1 | 4.4 | 0 |
| 4 | −14.1 | −38.4 | 2.7 | 2.2 |
| 5 | 4.8 | 7.9 | 3.8 | 1.9 | where:

the elements are numbered from left to right, the light entering element 1 first;

a positive radius means the center of curvature is to the right of the element;

a negative radius means the center of curvature is to the left of the element;

$R_L$ = radius of left face of lens;

$R_R$ = radius of right face of lens;

T = lens thickness at the central axis; and

D = distance to next lens element, at the axis;

and wherein said lens provides numerical aperture in the range from 0.7 to 0.8, and is color-corrected to accommodate a spectral range including light of wavelengths 478.5 nm and 496.5 nm.

2. An objective lens set forth in claim 1, wherein said five lens elements have the following approximate clear apertures at the entrance ($CA_1$) and exit ($CA_2$), and the following glass types:

| Lens Element | $CA_1$ | $CA_2$ | Glass |
|---|---|---|---|
| 1 | 13 | 13 | BK7 |
| 2 | 12 | 12 | SF4 |
| 3 | 12 | 12 | BK10 |
| 4 | 12 | 11 | SF4 |
| 5 | 7.9 | 4.9 | LAFN2 |

3. An objective lens as set forth in claim 2, wherein the following dimensions are employed:

| Element | $R_L$ | $R_R$ | T | D |
|---|---|---|---|---|
| 1 | 32.7044 | −15.0488 | 3.6079 | 1.8101 |
| 2 | −11.9675 | −38.3523 | 1.5351 | 1.7724 |
| 3 | 10.1568 | −14.1338 | 4.4491 | 0 |
| 4 | −14.1338 | −38.4148 | 2.7381 | 2.1824 |
| 5 | 4.8765 | 7.8559 | 3.7852 | 1.8934 |

4. A light-weight, wide-aperture objective lens for use in an optical disc recording system, said lens comprising:
- a first lens element of the double-convex type;
- a second lens element being of the negative meniscus type, having its concave surface facing said first lens element and spaced therefrom;
- a third lens element, being of the double-convex type, and spaced from said second lens element;
- a fourth lens element, being of the negative meniscus type and having its concave surface in surface contact with said third lens elements; and
- a fifth lens element, being of the positive meniscus type, having its convex surface toward said fourth lens element and spaced therefrom;
- wherein, provided said fifth element is spaced by a preselected distance from a plastic layer having uniform thickness, of approximately 1.2 mm, light from said objective lens is refracted through the layer and focused substantially at the point of exit from the layer;
- wherein said lens has radius, spacing and thickness dimensions approximately as follows:

| Element | $R_L$(mm) | $R_R$(mm) | T(mm) | D(mm) |
|---|---|---|---|---|
| 1 | 32.7 | −15.5 | 3.3 | 2.0 |
| 2 | −12.2 | −37.7 | 1.6 | 0.2 |
| 3 | 9.8 | −14.6 | 4.5 | 0 |
| 4 | −14.6 | −43.0 | 5.0 | 1.1 |
| 5 | 4.8 | 7.8 | 3.4 | 2.1 | where:
- the elements are numbered from left to right, the light entering element 1 first;
- a positive radius means the center of curvature is to the right of the element;
- a negative radius means the center of curvature is to the left of the element;
- $R_L$ = radius of left face of lens;
- $R_R$ = radius of right face of lens;
- T = lens thickness at the central axis; and
- D = distance to next lens element, at the axis.

5. An objective lens set forth in claim 4, wherein said five lens elements have the following approximate clear apertures at the entrance ($CA_1$) and exit ($CA_2$), and the following glass types:

| Lens Element | $CA_1$ | $CA_2$ | Glass |
|---|---|---|---|
| 1 | 13 | 13 | BK7 |
| 2 | 12 | 12 | SF4 |
| 3 | 12 | 12 | BK10 |
| 4 | 12 | 10 | SF4 |
| 5 | 7.8 | 5.2 | LAFN2 |

6. An objective lens as set forth in claim 5, wherein the following dimensions are employed:

| Element | $R_L$ | $R_R$ | T | D |
|---|---|---|---|---|
| 1 | 32.6695 | −15.4635 | 3.2362 | 2.0055 |
| 2 | −12.1539 | −37.6936 | 1.5540 | 0.2000 |
| 3 | 9.8044 | −14.5821 | 4.4889 | 0 |
| 4 | −14.5821 | −43.0454 | 5.0000 | 1.0751 |
| 5 | 4.7701 | 7.7597 | 3.4288 | 2.0934 |

* * * * *